United States Patent [19]

Ohtsuka

[11] 4,429,323
[45] Jan. 31, 1984

[54] METHOD OF ELECTRICALLY CONTACTING RECORDING MEDIUM

[75] Inventor: Shuichi Ohtsuka, Asaka, Japan

[73] Assignee: Fuji Photo Film Co., Ltd., Tokyo, Japan

[21] Appl. No.: 301,596

[22] Filed: Sep. 14, 1981

[30] Foreign Application Priority Data

Sep. 25, 1980 [JP] Japan ................................. 55-133322

[51] Int. Cl.³ ............................................. G01D 15/06
[52] U.S. Cl. .................................................. 346/153.1
[58] Field of Search .................. 346/135.1, 150, 153.1, 346/159, 155, 165, 139 R, 139 C

[56] References Cited

U.S. PATENT DOCUMENTS 3,534,383 10/1970 Tsukatani et al. ............... 346/153.1
3,713,996 1/1973 Letter ................................... 346/165

*Primary Examiner*—Thomas H. Tarcza
*Attorney, Agent, or Firm*—Gerald J. Ferguson, Jr.; Joseph J. Baker

[57] ABSTRACT

A method of electrically contacting a recording medium consisting of a support layer, an electrically conductive layer consisting of a binder having electrically conductive particles dispersed therein and a recording layer. A sharp electrode is pressed onto the recording medium with enough force to pierce the recording layer and establish electrical contact with the electrically conductive layer.

1 Claim, 5 Drawing Figures

METHOD OF ELECTRICALLY CONTACTING RECORDING MEDIUM

BACKGROUND OF THE INVENTION

1. Field of the Invention

This invention relates to a method of electrically contacting a recording medium, more particularly to a method of electrically contacting a recording medium of the type having a support layer at least the surface of which is electrically conductive, and a recording layer consisting of a photoconductor or a dielectric provided on said surface.

2. Description of the Prior Art

With this type of recording medium, in the case of electrically charging the surface of the recording layer, of carrying out electrostatic recording as by ion flow or by simultaneous single-line recording using a recording needle, of transferring a latent electrostatic image or toner image formed on the recording layer to another material, of transferring a latent electrostatic image to the recording layer from another material or of developing a latent electrostatic image formed on the recording layer, it is necessary to make electrical contact with the conductive layer in order to establish electrical connection with earth or an external electrical source. Also, there are other special cases when it becomes necessary to make electrical contact with the conductive layer as, for example, when it is necessary to connect the conductive layer with earth or an external electrical source in order to measure the charge potential of a photoconductive or insulating layer of the recording medium.

As methods for electrically contacting the conductive layer of the recording medium, there are known, among others, a method wherein the contact is established by peeling off the recording layer at an edge portion not used for recording an image and a method, as described in Japanese Patent Publication No. 500,394/1980, wherein a groove is formed from the surface of the recording layer into the conductive layer and a suspension containing electrically conductive particles is applied to the grooved portion so as to be exposed on the surface of the recording layer.

Although these methods provide good electrical connection, they are disadvantageous in that they require the formation of a portion for electrical contact, thus increasing the number of manufacturing processes for the recording medium and raising the cost of production. This increase in cost is not so important when the recording medium is used as a master recorded with a latent electrostatic image or toner image which is repeatedly transferred onto transfer printing materials. However, the higher cost becomes a major problem when the recording medium is to be used for recording of the final image.

In view of this cost problem, there has been devised a method of making electrical contact with the conducting layer of the recording medium by using a needle, rotating knife or toothed disk as the electrical contact means, i.e. as the electrode. In this method, the needle etc. is pressed onto the recording medium with a force large enough to cause it to pierce the recording layer and establish contact with the conductive layer.

This method is practical in that it makes it possible to establish electrical contact using a simple means without need of any processing of the recording medium in advance. It is, however, defective in that it does not permit the establishment of perfect electrical contact.

This defect results from the fact that the conductive layer of recording media currently in use is a thin layer of metal or the like formed by vacuum deposition. Particularly in the case of a transparent recording medium wherein the support layer, the conductive layer and the recording layer are all transparent, the maximum thickness that can be given to the metal or metal oxide conductive layer is some tens of angstroms. Thus when the conductive layer is pierced by a pin or the like, it is likely to tear, causing the contact between the needle and the conductive layer to be insufficient.

SUMMARY OF THE INVENTION

The object of the present invention is to provide a method of electrically contacting a recording medium which makes it possible to establish adequate electrical contact in the above-described electrical contacting method using a needle or the like.

This object is realized by pressing an electrode onto a recording medium consisting of a support layer having an electrically insulative surface, an electrically conductive layer consisting of a binder having electrically conductive particles dispersed therein, said electrically conductive layer being provided on said insulative surface of said support layer and a recording layer consisting of a photoconductive substance or a dielectric substance provided on said electrically conductive layer, the force of pressing being sufficient to cause said electrode to pierce said recording layer.

As in the present invention there is used an electrically conductive layer consisting of metal or other electrically conductive particles dispersed in a polymer binder such as polyvinyl alcohol, vinyl acetate, gelatin or the like, there is no danger of the conductive layer tearing when it is pierced by a needle or the like. Moreover, this composition of the conductive layer allows it to be made as thick as $10\mu$ without loss of transparency so that the area of contact between the conductive layer and the needle is large, whereby there is obtained adequate electrical contact.

Further objects and features of the method of electrically contacting a recording medium in accordance with the present invention will be better understood from the following description of preferred embodiments made in reference to the attached drawings.

DESCRIPTION OF THE PREFERRED EMBODIMENTS

Figure 1:
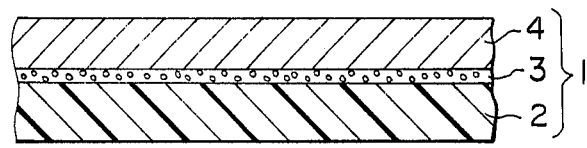
FIG. 1 is a longitudinal cross-sectional view of the recording medium used in the present invention.

A cross-sectional view of the recording medium used in the present invention is shown in FIG. 1.

The recording medium 1 has a transparent support layer 2 which is formed of an insulator material such as glass or plastic film having a thickness of not less than $20\mu$. The support layer 2 is coated with a transparent electrically conductive layer formed of a binder having electrically conductive particles dispersed therein and having a thickness of between about $0.1\mu$ and $10\mu$. As the electrically conductive particles there can be used particles of a diameter of $10\mu$ or less of a metal such as copper, silver or aluminum, a metal oxide such as zinc oxide, tin oxide or indium oxide, or a metal halide such as copper iodide. As the binder in which the electrically conductive particles are dispersed there can be used polyvinyl alcohol, vinyl acetate, gelatin, polycarbonate, polyethylene, polyester or the like. The conductive layer 3 is required to have a surface resistance not exceeding $10^9 \Omega$. On the surface of the conductive layer 3 is provided a recording layer 4 which, being a photoconductor formed of a thin film of Se, non-crystalline Si, CdS, ZnS, ZnO, Cu-Phthalocyanine or the like or of an organic photoconductor such as Triazol derivative, Oxaziazol derivative, Imidazole derivative, Pyrazolin derivative, Phenylendiamin derivative, Polyarylalkan or poly-N-vinylcarbozole derivative, dispersed in a binder, constitutes an electrophotosensitive material. Although it is preferable for the photoconductor to have intrinsic transparency, a non-transparent photoconductor can also be used if it is made thin enough. On the other hand, instead of being made from the photoconductor, the recording layer 4 can be formed of a thin layer of a dielectric such as Polyvinyl acetate, Polystyrene, Acrylic acidresin, Polyester or Silicone resin, in which case the recording medium can be used as an electrostatic recording medium or as a transfer material for latent electrostatic images or toner images.

Figure 2:
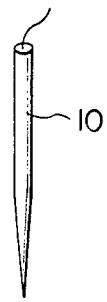
FIGS. 2, 3 and 4 are perspective views showing examples of electrodes used for electrically contacting the recording medium shown in FIG. 1.
Figure 3:
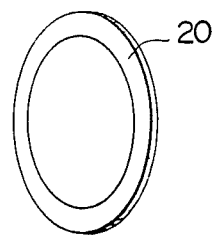

For electrically connecting the recording medium described above to earth etc., there is used a needle electrode 10 as shown in FIG. 2, a disk electrode 20 having a sharp edge as shown in FIG. 3 or a gear-shaped electrode 30 having needle-like teeth extending from its periphery. Whichever electrode is used, it must be electrically conductive at least in the vicinity of its tip or edge and must have greater hardness than the recording layer 4. The electrode can be made entirely of a metal such as iron, iron alloy, aluminum, aluminum alloy, copper or copper alloy or may be made of glass, ceramic or plastic with its tip or edge processed to be electrically conductive by the vacuum deposition or plating of a metal thereon.

Figure 5:
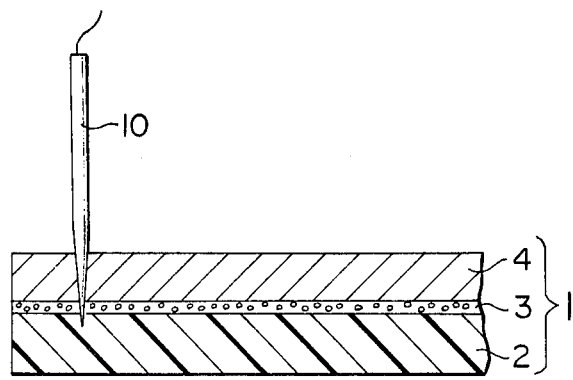

When the recording medium 1 is stationary during use, the needle electrode 10 can, as shown in FIG. 5, be stuck thereinto at one or more fixed points so as to pass through the interior conductive layer and establish electrical contact.

When the recording medium 1 moves during use, it is still possible to maintain continuous electrical contact with the needle 10 held stationary as shown in FIG. 5 since the needle will tear through the recording layer 4 and the conductive layer 3 as the recording medium advances. It is also possible to maintain continuous electrical contact by moving the needle electrode 10 together with the recording medium. On the other hand, however, there is no real need to maintain the electrical contact continuously. For example, in charging, developing and other processes, the contact between the conducting layer and the electrode may, without any adverse effect, be discontinuous insofar as the periods of no contact do not exceed the time constant, preferably 1/10 of the time constant, of the charge induced in the conductive layer by the process being carried out.

Figure 4:
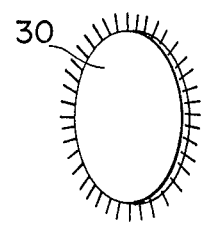

Also, when the process being conducted involves the movement of the point of contact between the conductive layer of the recording medium and the electrode, it is possible to realize smoother and more effective electrical contact by the disk electrode 20 shown in FIG. 3 or the gear-shaped electrode 30 shown in FIG. 4 than by the needle electrode 10.

Although the embodiments of the invention described above have been explained in connection with transparent FIG. 5 shows an example of how the recording medium may be pierced by an electrode electrophotosensitive materials and electrostatic recording materials, the method of electrical contact according to this invention is not limited to use with transparent recording mediums but can also be used with an opaque recording medium such as WP paper which consists of a resin-coated paper having an electrically conductive layer and a recording layer thereon. Moreover, the method of this invention can also be used for establishing electrical contact with recording media used for recording by the photomigration and electrophoretic methods.

EXAMPLE

A dispersion obtained by dispersing 30 wt% of tin oxide particles in gelatin was applied as a coating to a support layer, thereby to form an electrically conductive layer. On the electrically conductive layer, a photoconductive layer was formed by the application of a coating of poly-N-vinylcarbozole as a photosensitive material. As the electrode, there was used the gear-shaped electrode shown in FIG. 4. The electrode was made of metal. The electrode was pressed onto the recording medium from the side of the photoconductive layer with a force of 0.5 kg and the contact resistance between the electrode and the electrically conductive layer in this state was measured and found to be $8 \times 10^5 \Omega$.

Excellent contact characteristics were obtained when corona charging and development were carried out under the described conditions. The time constant for the corona charging and development was 1 sec.

I claim:

1. A method of electrically contacting a recording medium comprising pressing an electrode onto a recording medium consisting of a support layer having an electrically insulative surface, an electrically conductive layer consisting of a binder having electrically conductive layer particles dispersed therein, said electrically conductive layer being provided on said insulative surface of said support layer, and a recording layer consisting of a photoconductive substance or a dielectric substance provided on said electrically conductive layer, the force of pressing being such said electrode pierces said recording layer and establishes electrical contact between said electrode and said electrically conductive layer.

* * * * *